(12) United States Patent
Fabris et al.

(10) Patent No.: US 8,943,073 B2
(45) Date of Patent: Jan. 27, 2015

(54) SYSTEM AND METHOD FOR COMPARATIVE TRAVEL RECORD SCORING

(75) Inventors: Andres Fabris, Dallas, TX (US);
Richard Pendergast, Gainesville, TX (US)

(73) Assignee: Traxo LLC, Dallas, TX (US)

( * ) Notice: Subject to any disclaimer, the term of this patent is extended or adjusted under 35 U.S.C. 154(b) by 141 days.

(21) Appl. No.: 13/031,089

(22) Filed: Feb. 18, 2011

(65) Prior Publication Data

US 2012/0215797 A1    Aug. 23, 2012

(51) Int. Cl.
*G06F 17/30*   (2006.01)
*G06Q 30/02*   (2012.01)
*G06Q 50/00*   (2012.01)
*G06Q 50/14*   (2012.01)

(52) U.S. Cl.
CPC ............ *G06Q 30/0282* (2013.01); *G06Q 50/01* (2013.01); *G06Q 50/14* (2013.01)
USPC ........................................................ 707/751

(58) Field of Classification Search
USPC ......................................................... 707/751
See application file for complete search history.

(56) References Cited

U.S. PATENT DOCUMENTS

| | | | |
|---|---|---|---|
| 2010/0268673 A1* | 10/2010 | Quadracci | 706/12 |
| 2011/0290875 A1* | 12/2011 | Wengrovitz | 235/384 |
| 2012/0089641 A1* | 4/2012 | Wilde et al. | 707/771 |
| 2012/0143882 A1* | 6/2012 | Zheng et al. | 707/751 |

\* cited by examiner

*Primary Examiner* — Rehana Perveen
*Assistant Examiner* — Alexander Khong

(57) ABSTRACT

A system, method, and computer readable medium. A method of characterizing and comparatively scoring travel records of a plurality of travelers includes, for each traveler in the plurality of travelers, calculating a point value for each of a plurality of characteristics of a travel record of the traveler. The method also includes comparing the point values for the plurality of travelers and ordering the plurality of travelers according to the comparison. The method further includes, for each traveler in the plurality of travelers, storing a total score value representative of the position of the traveler in the ordered plurality of travelers.

22 Claims, 12 Drawing Sheets

| Metric > | Travel Coverage 302, 304, 306 | | | | | | |
|---|---|---|---|---|---|---|---|
| Weighting > | 30.0% | | | | | | |
| Point Value > | 1 | 2 | 5 | 10 | | | |
| Traveler # V | Total Unique States | Total Unique Verified States | Total Unique Countries | Total Unique Verified Countries | Total Points | Percentile (%) | Coverage Score |
| 1 | 5 | 0 | 0 | 0 | 5 | 5.2% | 1.5 |
| 2 | 6 | 1 | 2 | 1 | 28 | 6.8% | 2.0 |
| 3 | 7 | 2 | 4 | 2 | 51 | 8.7% | 2.6 |
| 4 | 8 | 3 | 6 | 3 | 74 | 11.1% | 3.3 |
| 5 | 9 | 4 | 8 | 4 | 97 | 13.9% | 4.2 |
| 6 | 10 | 5 | 10 | 5 | 120 | 17.1% | 5.1 |
| 7 | 11 | 6 | 12 | 6 | 143 | 20.7% | 6.2 |
| 8 | 12 | 7 | 14 | 7 | 166 | 24.8% | 7.5 |
| 9 | 13 | 8 | 16 | 8 | 189 | 29.3% | 8.8 |
| 10 | 14 | 9 | 18 | 9 | 212 | 34.2% | 10.3 |
| 11 | 15 | 10 | 20 | 10 | 235 | 39.3% | 11.8 |
| 12 | 16 | 11 | 22 | 11 | 258 | 44.6% | 13.4 |
| 13 | 17 | 12 | 24 | 12 | 281 | 50.0% | 15.0 |
| 14 | 18 | 13 | 26 | 13 | 304 | 55.4% | 16.6 |
| 15 | 19 | 14 | 28 | 14 | 327 | 60.7% | 18.2 |
| 16 | 20 | 15 | 30 | 15 | 350 | 65.8% | 19.7 |
| 17 | 21 | 16 | 32 | 16 | 373 | 70.7% | 21.2 |
| 18 | 22 | 17 | 34 | 17 | 396 | 75.2% | 22.5 |
| 19 | 23 | 18 | 36 | 18 | 419 | 79.3% | 23.8 |
| 20 | 24 | 19 | 38 | 19 | 442 | 82.9% | 24.9 |
| 21 | 25 | 20 | 40 | 20 | 465 | 86.1% | 25.8 |
| 22 | 26 | 21 | 42 | 21 | 488 | 88.9% | 26.7 |
| 23 | 27 | 22 | 44 | 22 | 511 | 91.3% | 27.4 |
| 24 | 28 | 23 | 46 | 23 | 534 | 93.2% | 28.0 |
| 25 | 29 | 24 | 48 | 24 | 557 | 94.8% | 28.5 |

| 281.0 | Avg |
|---|---|
| 169.3 | StDev |

| Metric > | Travel Volume | | | | |
|---|---|---|---|---|---|
| Weighting > | 30.0% | | | | |
| Point Value > | 1 | 2 | | | |
| Traveler # V | Total Miles Traveled | Total Verified Miles Traveled | Total Points | Percentile (%) | Miles Score |
| 1 | - | | - | 9.5% | 2.9 |
| 2 | 25,000 | | 25,000 | 10.3% | 3.1 |
| 3 | 50,000 | | 50,000 | 11.1% | 3.3 |
| 4 | 75,000 | | 75,000 | 11.9% | 3.6 |
| 5 | 100,000 | - | 100,000 | 12.8% | 3.9 |
| 6 | 125,000 | 25,000 | 175,000 | 15.8% | 4.7 |
| 7 | 150,000 | 50,000 | 250,000 | 19.2% | 5.8 |
| 8 | 175,000 | 75,000 | 325,000 | 23.0% | 6.9 |
| 9 | 200,000 | 100,000 | 400,000 | 27.3% | 8.2 |
| 10 | 225,000 | 125,000 | 475,000 | 31.8% | 9.5 |
| 11 | 250,000 | 150,000 | 550,000 | 36.7% | 11.0 |
| 12 | 275,000 | 175,000 | 625,000 | 41.8% | 12.5 |
| 13 | 300,000 | 200,000 | 700,000 | 47.0% | 14.1 |
| 14 | 325,000 | 225,000 | 775,000 | 52.3% | 15.7 |
| 15 | 350,000 | 250,000 | 850,000 | 57.5% | 17.2 |
| 16 | 375,000 | 275,000 | 925,000 | 62.6% | 18.8 |
| 17 | 400,000 | 300,000 | 1,000,000 | 67.5% | 20.2 |
| 18 | 425,000 | 325,000 | 1,075,000 | 72.1% | 21.6 |
| 19 | 450,000 | 350,000 | 1,150,000 | 76.4% | 22.9 |
| 20 | 475,000 | 375,000 | 1,225,000 | 80.2% | 24.1 |
| 21 | 500,000 | 400,000 | 1,300,000 | 83.7% | 25.1 |
| 22 | 525,000 | 425,000 | 1,375,000 | 86.7% | 26.0 |
| 23 | 550,000 | 450,000 | 1,450,000 | 89.4% | 26.8 |
| 24 | 750,000 | 475,000 | 1,700,000 | 95.4% | 28.6 |
| 25 | 1,000,000 | 500,000 | 2,000,000 | 98.7% | 29.6 |

| | |
|---|---|
| 743,000 | Avg |
| 566,997 | StDev |

FIGURE 4

| Metric > | Total Traxo Travel Score | | |
|---|---|---|---|
| Traveler # V | Total Traxo Travel Score (702) | Tier (704) | Descriptor (706) |
| 1 | 9 | 1 | Wanderer |
| 2 | 10 | 1 | Wanderer |
| 3 | 11 | 2 | Sightseer |
| 4 | 12 | 2 | Sightseer |
| 5 | 14 | 2 | Sightseer |
| 6 | 17 | 2 | Sightseer |
| 7 | 20 | 2 | Sightseer |
| 8 | 23 | 3 | Scout |
| 9 | 27 | 3 | Scout |
| 10 | 31 | 4 | Nomad |
| 11 | 36 | 4 | Nomad |
| 12 | 41 | 5 | Ranger |
| 13 | 46 | 5 | Ranger |
| 14 | 51 | 6 | Discoverer |
| 15 | 56 | 6 | Discoverer |
| 16 | 62 | 7 | Explorer |
| 17 | 68 | 7 | Explorer |
| 18 | 73 | 8 | Wayfarer |
| 19 | 78 | 8 | Wayfarer |
| 20 | 82 | 9 | Jetsetter |
| 21 | 86 | 9 | Jetsetter |
| 22 | 89 | 9 | Jetsetter |
| 23 | 91 | 10 | Conquistador |
| 24 | 95 | 10 | Conquistador |
| 25 | 97 | 10 | Conquistador |

FIGURE 7

SYSTEM AND METHOD FOR COMPARATIVE TRAVEL RECORD SCORING

TECHNICAL FIELD

This disclosure relates generally to an online social network and more specifically to a system and method for characterizing and comparatively scoring travel records of a collection of travelers.

BACKGROUND

Traditionally, an individual who contributes a comment to an online travel forum may self-characterize his/her experience or qualifications for expressing an opinion on a current topic of discussion. Others who comment may be known by their name or other identifier to participants in the forum. Participants reading comments in the forum may use such self-characterization or identification when deciding how much confidence to place in a comment posted to the forum.

SUMMARY

This disclosure provides a system and method for characterizing and comparatively scoring travel records of a collection of travelers.

Various embodiments include a system, method, and computer readable medium. A method of characterizing and comparatively scoring travel records of a plurality of travelers includes, for each traveler in the plurality of travelers, calculating a point value for each of a plurality of characteristics of a travel record of the traveler. The method also includes comparing the point values for the plurality of travelers and ordering the plurality of travelers according to the comparison. The method further includes, for each traveler in the plurality of travelers, storing a total score value representative of the position of the traveler in the ordered plurality of travelers.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 3 illustrates a data table for a travel characteristic;

FIG. 4 illustrates a data table for another travel characteristic;

FIG. 7 illustrates a data table presenting composite travel characteristic information;

DETAILED DESCRIPTION

Figure 1:
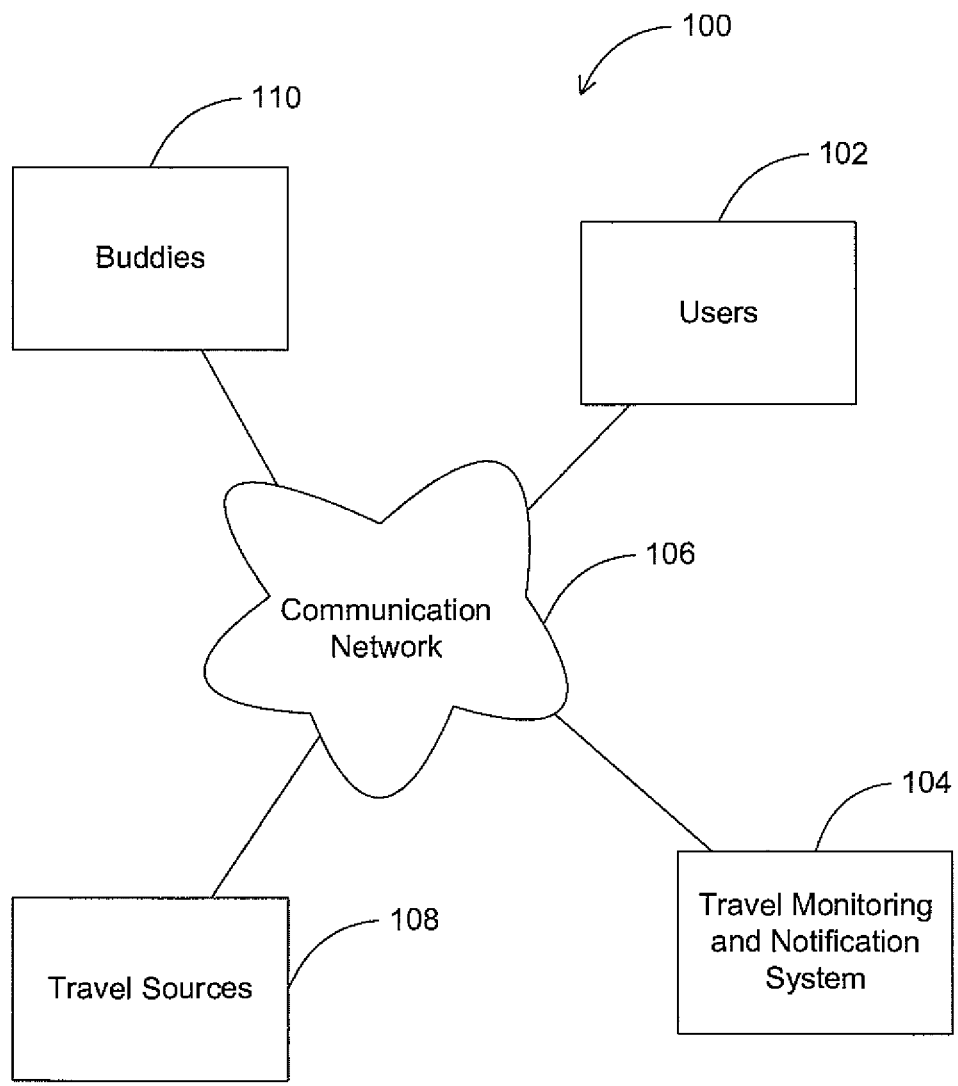
FIG. 1 presents a block diagram of a system according to the present disclosure.

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The present disclosure provides a system and method for characterizing and comparatively scoring travel records of a collection of travelers. Recalculation of scores for travelers may be performed daily or on some other fixed schedule. One or more travel characteristics of each traveler's travel record are measured, measured values aggregated across some or all travelers in the collection, and each traveler's measured value compared to the aggregated values to rank or order the traveler in comparison to other travelers in the collection. Measured values may be further qualified as information reported manually by the user ("unverified" or "unvalidated" information) or information obtained from the travel provider websites or other online data sources ("verified" or "validated" information).

Travel characteristics that are measured may include 'travel coverage', which may include unique states, countries, and/or continents visited by a traveler; 'travel volume', which may include miles traveled; 'travel frequency', which may include number of days spent traveling; and 'travel status', which may include benefit levels achieved in loyalty programs provided by airlines, hotel chains, car rental agencies, etc. Systems according to the disclosure weight measured values to give greater impact to verified information over unverified information or to give greater impact to more recent information over older information. More than one measured value (or weighted measured value) related to a travel characteristic may be combined to generate a total number of 'points' or other combined score for the traveler for that characteristic.

Systems according to the disclosure use total points for each user for a single travel characteristic to calculate one or more statistical values for the characteristic for some or all of the collection of travelers. Mean and standard deviation, cumulative distribution function, or any other suitable statistical function may be used to rank travelers by percentile or other comparative measure for the characteristic.

Systems according to the disclosure combine comparative measures for one or more travel characteristics for each traveler to generate an overall travel score for the traveler. Selected, predetermined weights are applied to one or more characteristics to give greater impact in the overall score to some characteristics over other characteristics. Overall travel scores for each user are used to calculate one or more statistical values for some or all of the collection of travelers. Mean and standard deviation, cumulative distribution function, or any other suitable statistical function may be used to rank travelers by overall percentile or other comparative measure for the travelers' overall scores.

Overall percentile or overall travel score are used by systems according to the disclosure may to identify individual travelers as having achieved an echelon or other categorization that characterizes the traveler's experience level as a traveler. For example, travelers may be categorized into deciles, which may be given names from lowest to highest, such as Wanderer, Sightseer, Scout, Nomad, Ranger, Discoverer, Explorer, Wayfarer, Jetsetter, and Conquistador.

Systems according to the disclosure take predefined actions when a traveler's score or percentile rises above or falls below a predetermined threshold value. For example, when a traveler advances to a higher echelon, an email or Short Message Service (SMS or 'text') message may be sent to the traveler, a another traveler in the collection of travelers, or an external recipient. Such messages may also be sent to advertisers or other third parties who have subscribed to alerts relating to travelers' scores.

Systems according to the disclosure may display a traveler's current total points or ranking, or individual travel characteristic points or ranking. Such information may be displayed on the traveler's home page at a website for the system, or on the traveler's blog page, or along with comments that the traveler posts to discussion or chat groups. Systems according to the disclosure may provide Hypertext Markup Language (HTML) code (a "snippet" or an "applet") that a traveler may include in a Web page, where the code in the snippet accesses the system, obtains the traveler's score or ranking, and displays the information in text and/or graphical format.

Systems according to the disclosure may license third parties to receive information relating to travelers' travel scores or rankings, or individual travel characteristic points or rankings. In some embodiments, third parties use an application program interface (API) or other defined interface to access the system to obtain current points or ranking information for an identified traveler or group of travelers. In other embodiments, information for some or all travelers is sent to or pulled by the third party when the information changes or on a preset, regular time interval.

Such third parties may use such information to offer incentives to travelers scoring at or above a particular decile or other scoring threshold. Similarly, systems according to the disclosure may offer free services or other benefits to travelers achieving a predetermined threshold of points or ranking.

FIG. 1 presents a block diagram of a system 100 according to the present disclosure. Users 102 are clients of a travel monitoring and notification system 104, and communicate with the system 104 via a communication network 106. The communication network 106 may be the Internet, a cellular network, or other suitable public or private network for linking multiple parties for communication.

The travel monitoring and notification system 104 communicates with travel sources 108 to obtain, pull, receive, push, or distribute data regarding travel plans and reservations made by individual travelers or users 102. The system 104 processes the travel plan data and, in a manner approved by the individual user 102, collects information about the user's historical or future travel plans. Such information may be communicated to one or more so-called "buddies" 110 (other users of the system 100 who have been previously or are subsequently identified by the user 102).

Figure 2:
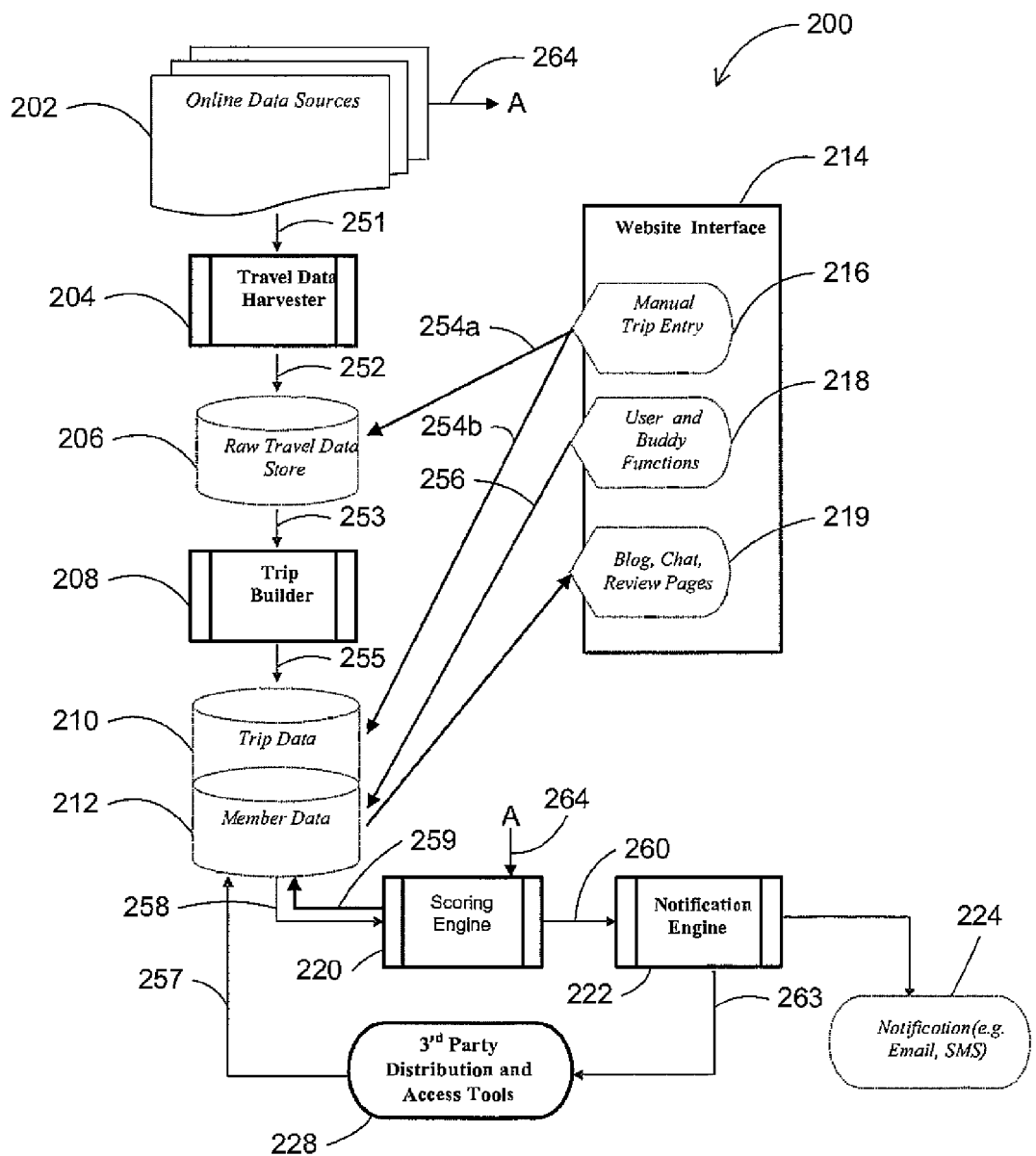
FIG. 2 is a block diagram of another system in accordance with the present disclosure.

FIG. 2 is a block diagram of a system 200 in accordance with the present disclosure. The system 200 includes processing components, whose operations will be described in detail below.

A travel data harvester 204 extracts travel information from third party travel websites and/or other online sources 202 of travel data. Such online data sources 202 may be accessed through an HTML interface or through application program interfaces (APIs), web services, applets, and portable applications provided by the online data source 202. The travel data harvester 204 may also have such travel information "pushed" to it by the online data sources 202 or be notified of such travel information by other methods. The travel data harvester 204 stores such travel information into a raw travel data store 206.

A trip builder 208 standardizes and aggregates the data in the raw travel data store 206 to generate data on individual trips that are stored in a trip database 210. A scoring engine 220 monitors data in the trip database 210 and in a member database 212.

A website interface 214 provides a secured Website where the user 102 can sign up for service, view notifications, manage trips, review travel record scoring results, interact with other users, and manage settings and preferences. Third party tools 228 provide distribution and access tools for third parties, such as application program interfaces (APIs), web services, applets, feeds, and portable applications allow data from the system 200 to be read and written by third party applications and Websites.

The user 102 uses a manual trip entry function 216 of a website interface 214 to create raw travel data in the raw travel data store 206. The user 102 may enter information related to scheduled or unscheduled travel providers or lodging providers. The user 102 may also enter information related to planned activities such as theater, dining or golf at a destination, which information may include location and reservation date and time.

The user 102 uses user and buddy functions 218 of the website interface 214 to create and modify his/her member account in the member database 212 via a data flow 256. The user may perform these same functions from a third party website via the third party tools 228.

Data flows in FIG. 2 include travel information 251 that is polled by or pushed to the travel data harvester 204 from one or more of online data sources 202. The travel data harvester 204 stores raw travel data 252 in a raw travel data store 206. Users manually input raw travel data 254a to the raw travel data store 206 via the website interface 214.

The trip builder 208 reads data 253 from the raw travel data store 206 and generates trip data 255 for storage in the trip database 210. Users manually input trip data 254b to the trip database 210 via the website interface 214.

Via the website interface 214, users also input and change data and perform other functions on user and buddy information in the member database 212. Examples of such activities include creating a new account, forming buddy connections, and updating user account information.

The user 102 uses page functions 219 of the website interface 214 to visit other users' blogs, chat rooms where users can exchange information, or pages on which users can post reviews of particular resorts, destinations, travel providers, lodging providers, or other topics of interest to travelers. In such blog, chat or review web pages, users' comments may be accompanied by a text or graphical indication of the commenter's travel score or ranking. Such an indication may help readers of the comments decide how much weight or credence to assign to the comment.

Third parties use the third party tools 228 to pull data 257 from the trip database 210 and/or the member database 212. A notification engine 222 sends a notification or other message 263 to a third party application via the third party tools 228.

A scoring engine 220 reads data 258 from the trip database 210 and the member database 212 to score members' travel records and calculate rankings of individual members' scores in comparison to aggregate scores for all members. The scoring engine 220 bases its scoring on travel characteristic information relating to completed trips, rather than on information relating to upcoming trips. Such travel characteristic information on completed trips may be reported manually by the user ("unverified" or "unvalidated" information) or may be information obtained from the travel provider websites or other online data sources 202 via a dataflow 264 ("verified" or "validated" information). Such verification information may be stored in the trip database 210 and/or the member database 212 by the trip builder 208.

The scoring engine 220 stores score information 259 in the member database 212. The scoring engine 220 also sends score information 260 to the notification engine 222.

The notification engine 222 applies stored rules that act as triggers to prompt actions by the notification engine 222. In response to some triggers, the notification engine 222 sends an email, SMS, or other message 224 to recipients identified by a traveler, or licensed by the system to receive such messages. In response to other triggers, the notification engine 222 sends information 263 relating to recent score, point or ranking updates to third party subscribers that have requested to receive such information, via third party tools 228. Such distribution to third parties may be in the form of a 'blast' or 'push' message, or may be in the form of a notification message that new information has been placed in a file transfer protocol (FTP) server or other storage facility for retrieval by the third party.

Figure 12:
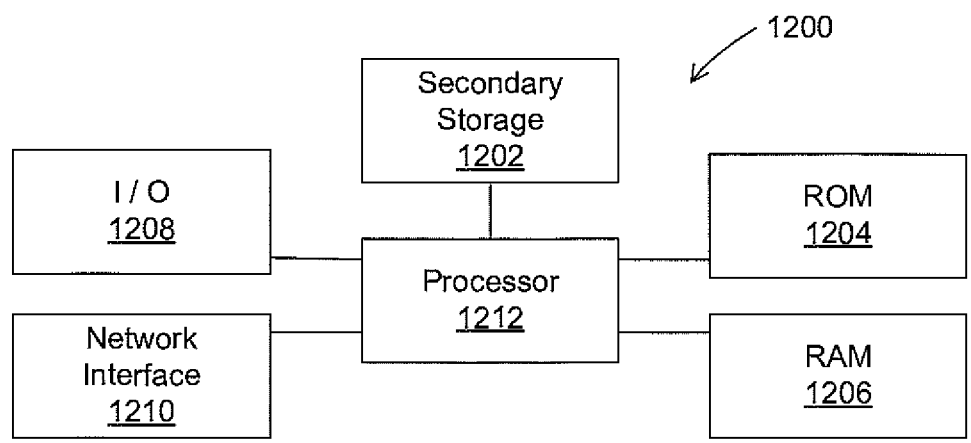
FIG. 12 illustrates a data processing system in accordance with the present disclosure.

The elements of the disclosed system 200 may be implemented on one or more data processing systems that have sufficient processing power, memory resources, and network throughput capability to handle the necessary workload placed upon it/them. FIG. 12 illustrates a data processing system in which an embodiment can be implemented, for example as a comparative travel scoring system configured to perform processes as described herein, embodied in a typical, general-purpose computer system 1200. The general-purpose computer 1200 includes a processor 1212 (which may be referred to as a central processor unit or CPU) that is in communication with computer readable devices including secondary storage 1202, read only memory (ROM) 1204, and random access memory (RAM) 1206. The processor 1212 is also in communication with input/output (I/O) devices 1208, and network interface 1210. The processor 1212 may be implemented as one or more CPU chips.

The secondary storage 1202 is typically comprised of one or more disk drives, solid state (flash) drives, or tape drives and is used for non-volatile storage of data and as an over-flow data storage device if RAM 1206 is not large enough to hold all working data. The secondary storage 1202 may be used to store programs that are loaded into RAM 1206 when such programs are selected for execution. The ROM 1204 is used to store instructions and may store data that are read during program execution. The ROM 1204 is a non-volatile memory device that typically has a small memory capacity relative to the larger memory capacity of the secondary storage 1202. The RAM 1206 is used to store volatile data and perhaps to store instructions. Access to both the ROM 1204 and the RAM 1206 is typically faster than to the secondary storage 1202.

The I/O devices 1208 may include printers, video monitors, liquid crystal displays (LCDs), touch screen displays, keyboards, keypads, switches, dials, mice, personal digital assistants (PDAs), cell phones, track balls, voice recognizers, card readers, scanners, paper tape readers, or other well-known input devices. The network connectivity devices 1210 may include modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other devices. These network connectivity devices 1210 may enable the processor 1212 to communicate via communication link 1214 with an Internet or one or more intranets. With such a network connection, it is contemplated that the processor 1212 might receive information from the network, or might output information to the network in the course of performing the above-described functions.

The processor 1212 executes instructions, codes, computer programs, scripts that it accesses from hard disk, floppy disk, optical disk (these various disk based systems may all be considered secondary storage 1202), ROM 1204, RAM 1206, or the network connectivity devices 1210.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a flash drive, a compact disc (CD), a digital video disc (DVD), or any other type of memory.

FIGS. 3-7 illustrate information that are calculated, stored and/or displayed by one or more data processing systems configured to implement systems according to the disclosure. While FIGS. 3-7 present the information in the form of separate tables grouped by travel characteristic and itemized by traveler, it will be understood that in other embodiments the information is grouped by traveler and itemized by characteristic. In some embodiments, the information is stored in a traveler's record in the member database 212 along with other information relating to the traveler. In other embodiments, the information is stored in the trip database 210 in trip records keyed to the traveler. In the description that follows, capitalized phrases refer to columns in the data table of FIGS. 3-7 having the same (or similar) phrases as column headers. Information for individual travelers is presented in separate rows, identified by a Traveler Number (Traveler #) or other identifier.

FIG. 3 illustrates a data table 300 for the travel characteristic referred to as travel coverage 302. Measured values are tallied for Total Unique States (a total unverified number of states the traveler has reported visiting, with no individual state counted more than once), Total Unique Verified States (a total number of states the traveler has visited, verified by independent sources of information, such as travel and lodging providers, with no individual state counted more than once). Similar measured values are tallied for Total Unique (unverified) Countries and Total Unique Verified Countries. In other embodiments, similar measured values are tallied for cities, provinces, continents or other destinations or groupings of destinations based on geographical or other criteria. Preferably, verified states or countries are not also tallied as unverified states or countries.

Travel coverage measured values (or counts) are weighted by predetermined weights 306 and aggregated to calculate a Total Points coverage value for each traveler. Typically, verified measured values are given a higher weight than unverified measured values. States (countries, cities, etc.) that have been visited more recently (for example, within the last year) may be given a higher weight than less recently visited states. Statistical measures 308 are calculated from the travelers' coverage Total Points for some or all of the travelers in the member database 212. In the embodiments illustrated in FIGS. 3-7, the statistical measures calculated are Average (mean) and Standard Deviation. Using the statistical measures 308, each traveler's coverage Total Points are used to calculate a coverage Percentile for the traveler. In the embodiments illustrated in FIGS. 3-7, a cumulative distribution function calculated from each travel characteristic's statistical measures is used to calculate each traveler's coverage Percentile for the characteristic. Finally, each traveler's coverage Percentile is weighted by a weight 304 to calculate a Coverage Score. As is described in greater detail with reference to FIG. 7, the Coverage Score is combined with scores for other travel characteristics to calculate an overall Travel Score for each traveler.

While FIG. 3 shows two unverified measured values and two verified values being used to calculate a traveler's Coverage Score, in other embodiments other numbers and/or combinations of verified and unverified measured values may be used. Similarly, while numbers of states and countries visited by the traveler are measured in FIG. 3, measured values of other features of the traveler's travel record that are representative of the traveler's travel coverage may be used in other embodiments. Furthermore, while particular values for measured value weights 306 and characteristic weight 304 are shown in FIG. 3, in other embodiments other weights may be used.

It will be understood that, while FIG. 3 illustrates a particular procedure for calculating Coverage Score for a traveler's travel coverage characteristic, in other embodiments other procedures may be used to tally measured values that represent a traveler's travel coverage and combine those values across a group of travelers to calculate a representative score for each traveler relative to other travelers in the group.

FIG. 4 illustrates a data table 400 for the travel characteristic referred to as travel volume 402. Measured values are tallied for Total Miles Traveled (a total unverified number of miles that the traveler has reported traveling) and Total Verified Miles Traveled (a total number of miles the traveler has traveled, verified by independent sources of information, such as travel providers). Preferably, verified miles traveled are not also tallied as unverified miles traveled.

Travel volume measured values are weighted by predetermined weights 406 and aggregated to calculate a Total Points volume value for each traveler. Miles that have been accumulated more recently may be given a higher weight than less recently accumulated miles. Statistical measures 408 are calculated from the travelers' volume Total Points for some or all of the travelers in the member database 212. Using the statistical measures 408, each traveler's volume Total Points are used to calculate a volume Percentile for the traveler. A cumulative distribution function calculated from the statistical measures 408 is used to calculate each traveler's volume Percentile. Finally, each traveler's volume Percentile is weighted by a weight 404 to calculate a Miles Score. As is described in greater detail with reference to FIG. 7, the Miles Score is combined with scores for other travel characteristics to calculate an overall Travel Score for each traveler.

While FIG. 4 shows one unverified measured value and one verified value being used to calculate a traveler's Miles Score, in other embodiments other numbers and/or combinations of verified and unverified measured values may be used. Similarly, while miles traveled by the traveler are measured in FIG. 4, measured values of other features of the traveler's travel record that are representative of the traveler's travel volume may be used in other embodiments. Furthermore, while particular values for measured value weights 406 and characteristic weight 404 are shown in FIG. 4, in other embodiments other weights may be used. It will be understood that, while FIG. 4 illustrates a particular procedure for calculating a Miles Score for a traveler's travel volume characteristic, in other embodiments other procedures may be used to tally measured values that represent a traveler's travel volume and combine those values across a group of travelers to calculate a representative score for each traveler relative to other travelers in the group.

Figure 5:
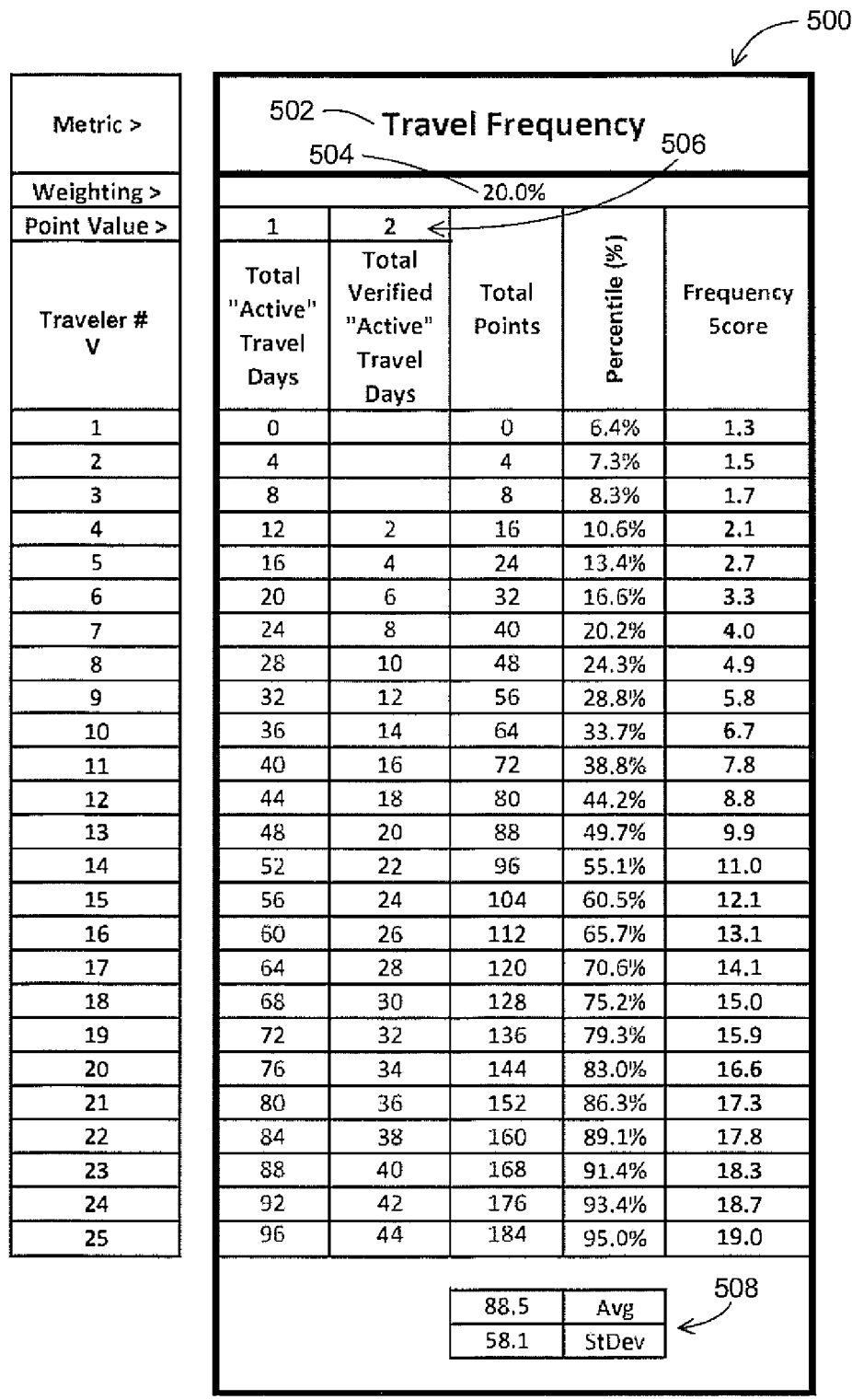
FIG. 5 illustrates a data table for yet another travel characteristic.

FIG. 5 illustrates a data table 500 for the travel characteristic referred to as travel frequency 502. Measured values are tallied for Total "Active" Travel Days (a total unverified number of days that the traveler has reported traveling) and Total Verified "Active" Travel Days (a total number of days the traveler has traveled, verified by independent sources of information, such as travel and/or lodging providers). Preferably, verified travel days are not also tallied as unverified travel days.

Travel frequency measured values are weighted by predetermined weights 506 and aggregated to calculate a Total Points frequency value for each traveler. More recent days of travel may be given a higher weight than less recent travel days. Statistical measures 508 are calculated from the travelers' frequency Total Points for some or all of the travelers in the member database 212. Using the statistical measures 508, each traveler's frequency Total Points are used to calculate a frequency Percentile for the traveler. A cumulative distribution function calculated from the statistical measures 508 is used to calculate each traveler's frequency Percentile. Finally, each traveler's frequency Percentile is weighted by a weight 504 to calculate a Frequency Score. As is described in greater detail with reference to FIG. 7, the Frequency Score is combined with scores for other travel characteristics to calculate an overall Travel Score for each traveler.

While FIG. 5 shows one unverified measured value and one verified value being used to calculate a traveler's Frequency Score, in other embodiments other numbers and/or combinations of verified and unverified measured values may be used. Similarly, while a traveler's travel days are measured in FIG. 5, measured values of other features of the traveler's travel record that are representative of the traveler's travel frequency may be used in other embodiments. Furthermore, while particular values for measured value weights 506 and characteristic weight 504 are shown in FIG. 5, in other embodiments other weights may be used. It will be understood that, while FIG. 5 illustrates a particular procedure for calculating a Frequency Score for a traveler's travel frequency characteristic, in other embodiments other procedures may be used to tally measured values that represent a traveler's travel frequency and combine those values across a group of travelers to calculate a representative score for each traveler relative to other travelers in the group.

Figure 6:
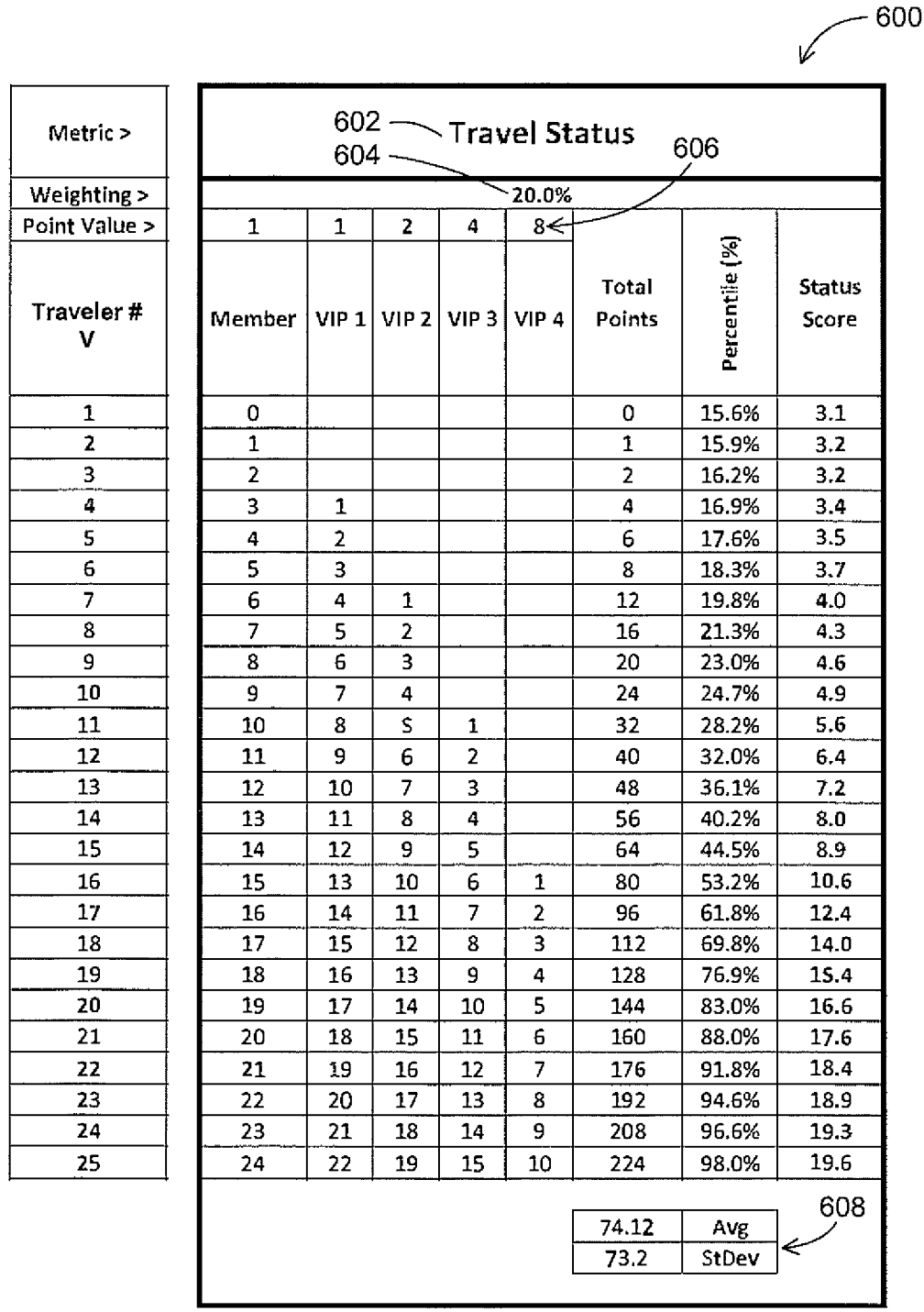
FIG. 6 illustrates a data table for still another travel characteristic.

FIG. 6 illustrates a data table 600 for the travel characteristic referred to as travel status 602. Travel status measures a traveler's participation and achievements in loyalty programs offered by providers of travel, lodging, and other services. Measured values are tallied for Member (number of loyalty programs in which the traveler is a member). Measured values are also tallied for VIP 1, VIP 2, VIP 3, and VIP 4 (number of loyalty programs in which the traveler has achieved, respectively, first, second, third and fourth "elite" levels, that is, levels of acknowledgement of certain total numbers of miles traveled, days lodged, or other services purchased within a year). Typically, travel status measured values are obtained independently from the loyalty programs and are considered verified values. In some embodiments, travel status measured values are reported by the travelers and are unverified values.

Travel status measured values are weighted by predetermined weights 606 and aggregated to calculate a Total Points status value for each traveler. More recently joined programs or elite levels may be given a higher weight than less recent accomplishments. Statistical measures 608 are calculated from the travelers' status Total Points for some or all of the travelers in the member database 212. Using the statistical measures 608, each traveler's status Total Points are used to calculate a status Percentile for the traveler. A cumulative distribution function calculated from the statistical measures 608 is used to calculate each traveler's status Percentile. Finally, each traveler's status Percentile is weighted by a weight 604 to calculate a Status Score. As is described in greater detail with reference to FIG. 7, the Status Score is combined with scores for other travel characteristics to calculate an overall Travel Score for each traveler.

While FIG. 6 shows five measured values being used to calculate a traveler's Status Score, in other embodiments other numbers of measured values may be used. Such measured values may also be any suitable combination of verified and unverified values. Similarly, while a traveler's participation in loyalty programs is measured in FIG. 6, measured values of other features of the traveler's travel record that are representative of the traveler's travel status may be used in other embodiments. Furthermore, while particular values for measured value weights 606 and characteristic weight 604 are shown in FIG. 6, in other embodiments other weights may be used. It will be understood that, while FIG. 6 illustrates a particular procedure for calculating a Status Score for a traveler's travel status characteristic, in other embodiments other procedures may be used to tally measured values that represent a traveler's travel status and combine those values across a group of travelers to calculate a representative score for each traveler relative to other travelers in the group.

FIG. 7 illustrates a data table 700 in which each traveler's Coverage Score, Miles Score, Frequency Score and Status Score are added to calculate a composite Total Travel Score 702. Because the traveler's Percentile for each travel characteristic is weighted by a set of characteristic weights that total 100 percent, the traveler's Total Travel Score 702 is a value between zero and 100. The Total Travel Scores 702 can be easily separated into deciles, which are used to assign each traveler to a Tier 704 or echelon. Each Tier 704 is given a Descriptor 706 (such as Wanderer, Sightseer, Scout, etc.), to provide a simplified, text-based description of the traveler's Total Travel Score 702 and ranking within the group of travelers used in the scoring process described with reference to FIGS. 3-7.

Systems according to the disclosure may maintain historical information relating to a traveler's points, scores, or echelon. Such systems may keep such information for one or more characteristics or for aggregate total scores. Such systems may further characterize travelers by an amount of change in such information over a predetermined period, and rank or order travelers based upon such a measure of change.

Systems according to the disclosure may include in the scoring not only measured values relating to completed trips, but also measured values relating to planned trips. Such future measured values may be tallied for one or more characteristics. Such future measured values may be unverified or may be verified (i.e., bookings or reservations confirmed by a travel providers). Such future measured values may be limited to a predetermined period in the future (e.g., one month, six months, etc.). Such future measured values may be combined with measured values of completed trips to calculate predicted future scores or echelons for travelers. Such future measured values may be scored and ranked separately, to provide comparative scoring for the predetermined future period.

Figure 8:
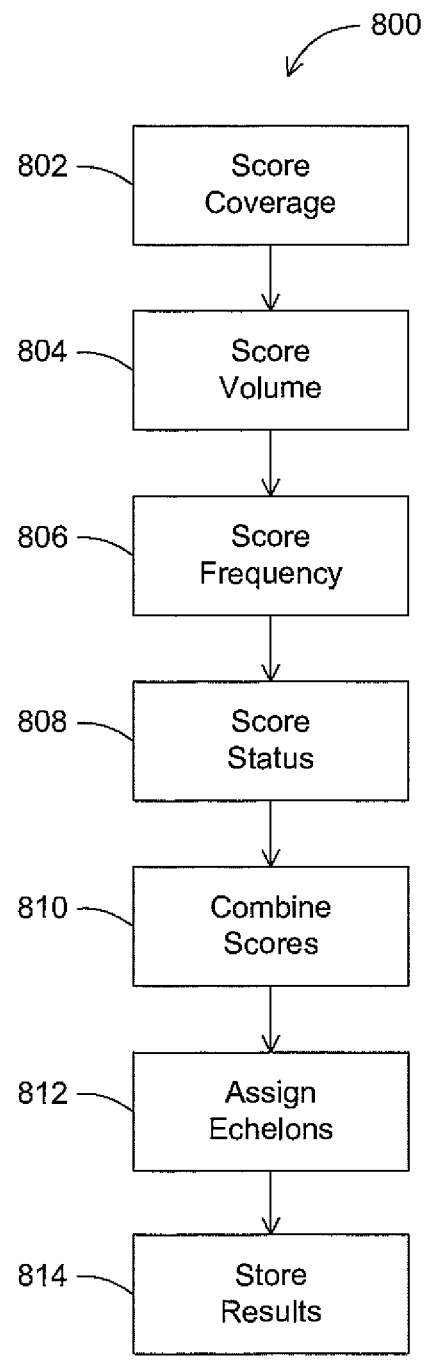
FIG. 8 depicts a method of scoring travelers that may be used in a system according to the disclosure.

FIG. 8 depicts a method 800 that may be used in a system according to the disclosure in a scoring engine such as the scoring engine 220 of FIG. 2. In step 802, the scoring engine 220 scores a travel coverage characteristic for a group of travelers. A process such as that described with reference to the data table 300 of FIG. 3 may be used perform such coverage scoring. In step 804, the scoring engine 220 scores a travel volume characteristic for the group of travelers. A process such as that described with reference to the data table 400 of FIG. 4 may be used perform such volume scoring.

In step 806, the scoring engine 220 scores a travel frequency characteristic for the group of travelers. A process such as that described with reference to the data table 500 of FIG. 5 may be used perform such frequency scoring. In step 808, the scoring engine 220 scores a travel status characteristic for the group of travelers. A process such as that described with reference to the data table 600 of FIG. 6 may be used perform such status scoring.

In step 810, the scoring engine 220 combines each traveler's score for the travel characteristics calculated in steps 802-808 and, in step 812, assigns the travelers to echelons or tiers. A process such as that described with reference to the data table 700 of FIG. 7 may be used perform the combining of step 810 and assigning of step 812. In step 814, the scoring engine 220 stores the information calculated in steps 802-812 in the member database 212 and sends an activation message to the notification engine 222.

While FIG. 8 shows the combining of scores for travel coverage, volume, frequency, and status in step 810, it will be understood that, in other embodiments, scores for fewer than all these characteristics may be combined. In still other embodiments, scores for other travel characteristics may be combined with, or instead of, the travel characteristics shown in FIG. 8.

Figure 9:
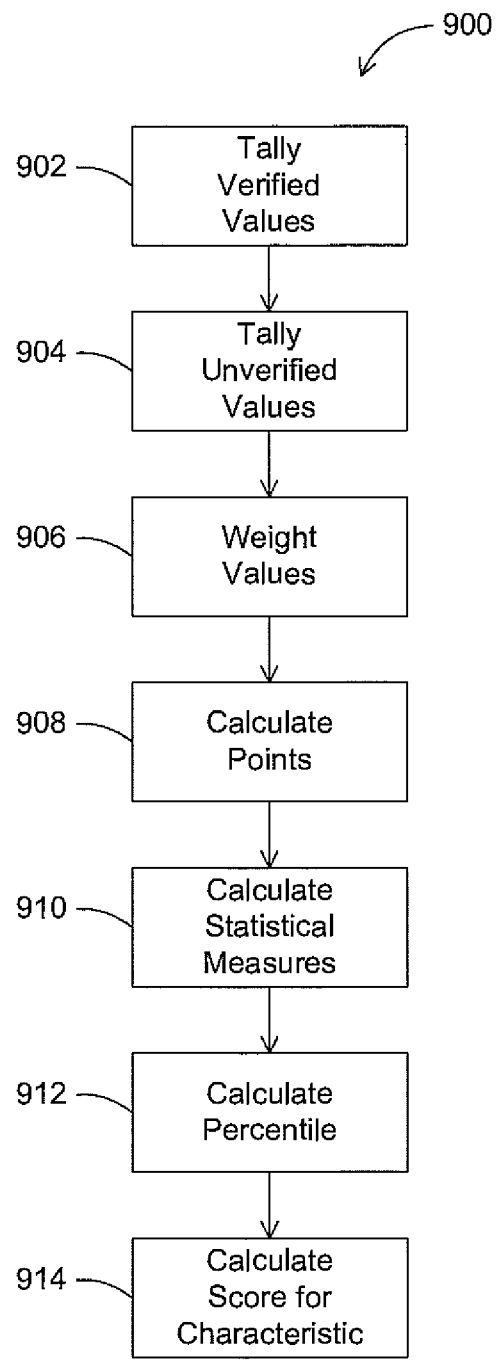
FIG. 9 depicts another method of scoring travelers that may be used in a system according to the disclosure.

FIG. 9 depicts a method 900 that may be used by a system according to the disclosure to score travelers for a particular travel characteristic. In step 902, any verified measured values for the travel characteristic are tallied and, in step 904, any unverified measured values are tallied. In step 906, measured values (verified and/or unverified) are weighted and, in step 908, used to calculate a total number of points for the characteristic. It will be understood that the steps 902-908 are performed for each traveler in a group of travelers. In step 910, statistical measures are calculated based on the total points for each traveler in the group of travelers. In step 912, a percentile into which each traveler's total points falls is calculated and, in step 914, each traveler's percentile is weighted by a characteristic weight to calculate a score for each traveler for the characteristic.

Figure 10:
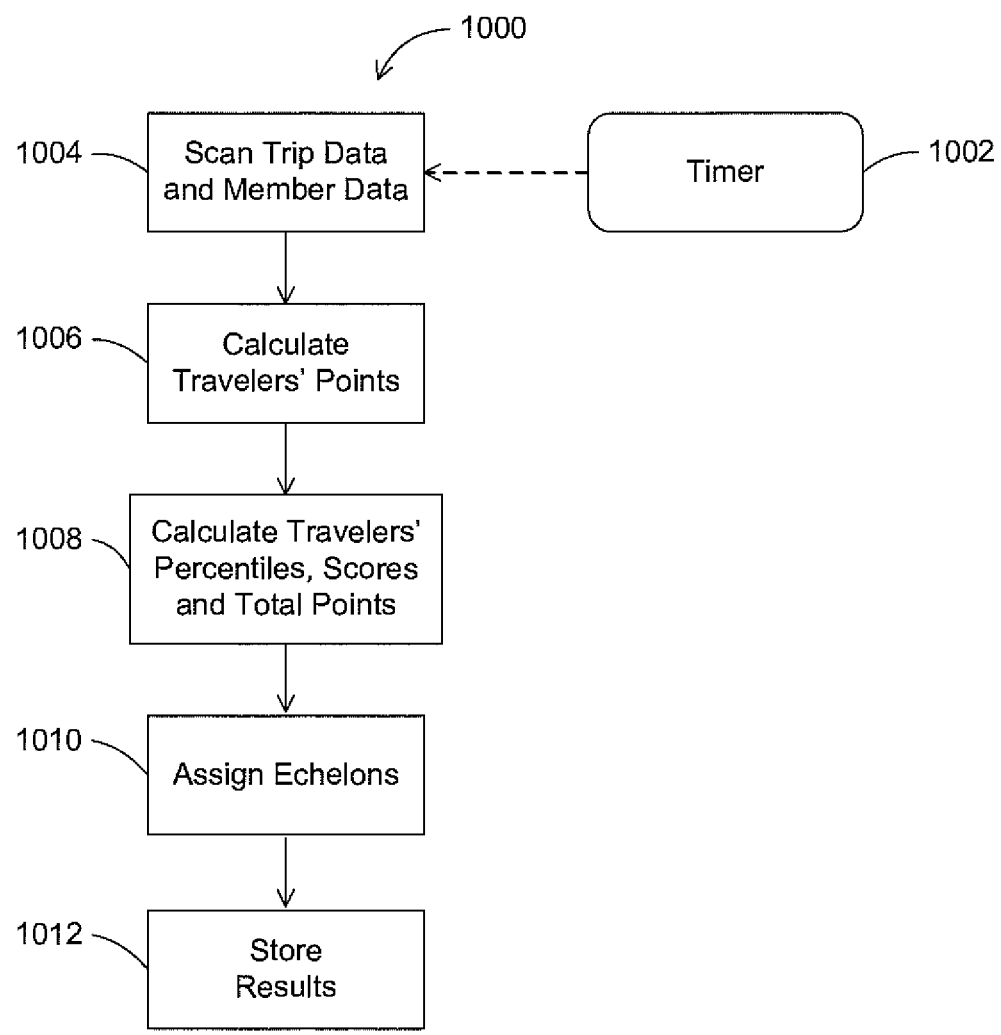
FIG. 10 depicts yet another method of scoring travelers that may be used in a system according to the disclosure.

FIG. 10 depicts a method 1000 that may be used in another system according to the disclosure in a scoring engine such as the scoring engine 220 of FIG. 2. A timer 1002 or clock initiates the method 1000 at a predetermined interval or time (for example, every 12 hours or at midnight). In other embodiments, the method 1000 may be initiated by detecting that updated information has been written to the trip database 210 or the member database 212. In still other embodiments, the method 1000 may be initiated manually by an operator or upon a signal from a source external to the system 200.

In step 1004, the scoring engine 220 scans the trip database 210 and the member database 212 to detect information that has changed since a last activation of the method 1000. The trip database 210 is scanned for trips whose date information indicates that the trip (or a portion thereof) has been completed. The member database 212 may be scanned for self-reported travel characteristics. Travel characteristic information in the trip data 310 or the member data 312 may include information related to whether the travel characteristic information is verified or unverified. If such verification information is not stored in the trip data 310 or the member data 312, step 1004 includes accessing the travel provider websites or other online data sources 202 to obtain the verification information.

In step 1006, the scoring engine 220 calculates travel characteristic Points for each traveler whose information in the trip database 210 and/or the member database 212 has changed. Such calculation may be carried out as described with reference to steps 902-908 of the method 900 shown in FIG. 9 for one or more of the traveler's travel characteristics. In some embodiments, one or more of the steps 902-908 access all trip information for the traveler in the trip database 210 and/or the member database 212. In other embodiments, one or more of the steps 902-908 modifies previously calculated travel characteristic information with new information identified in step 1004.

In step 1008, after travelers' Points have been calculated for all travelers whose information was detected to have changed in step 1004, the scoring engine 220 calculates statistical measures for each travel characteristic using Points for some or all of the travelers in the member database 212. Also in step 1008, the scoring engine 220 recalculates Percentiles and Scores for one or more travel characteristics for all of the travelers in the member database 212, and recalculates Total Travel Scores. Such calculations may be carried out as described with reference to steps 910-914 of the method 900 shown in FIG. 9 and step 810 of the method 800 shown in FIG. 8.

In step 1010, the scoring engine 220 assigns the travelers in the member database 212 to tiers or echelons according to their Total Travel Scores and, in step 1012, stores the information calculated in the steps 1004-1010 in the member database 212. In step 1012, the scoring engine 220 also sends an activation message to the notification engine 222.

Figure 11:
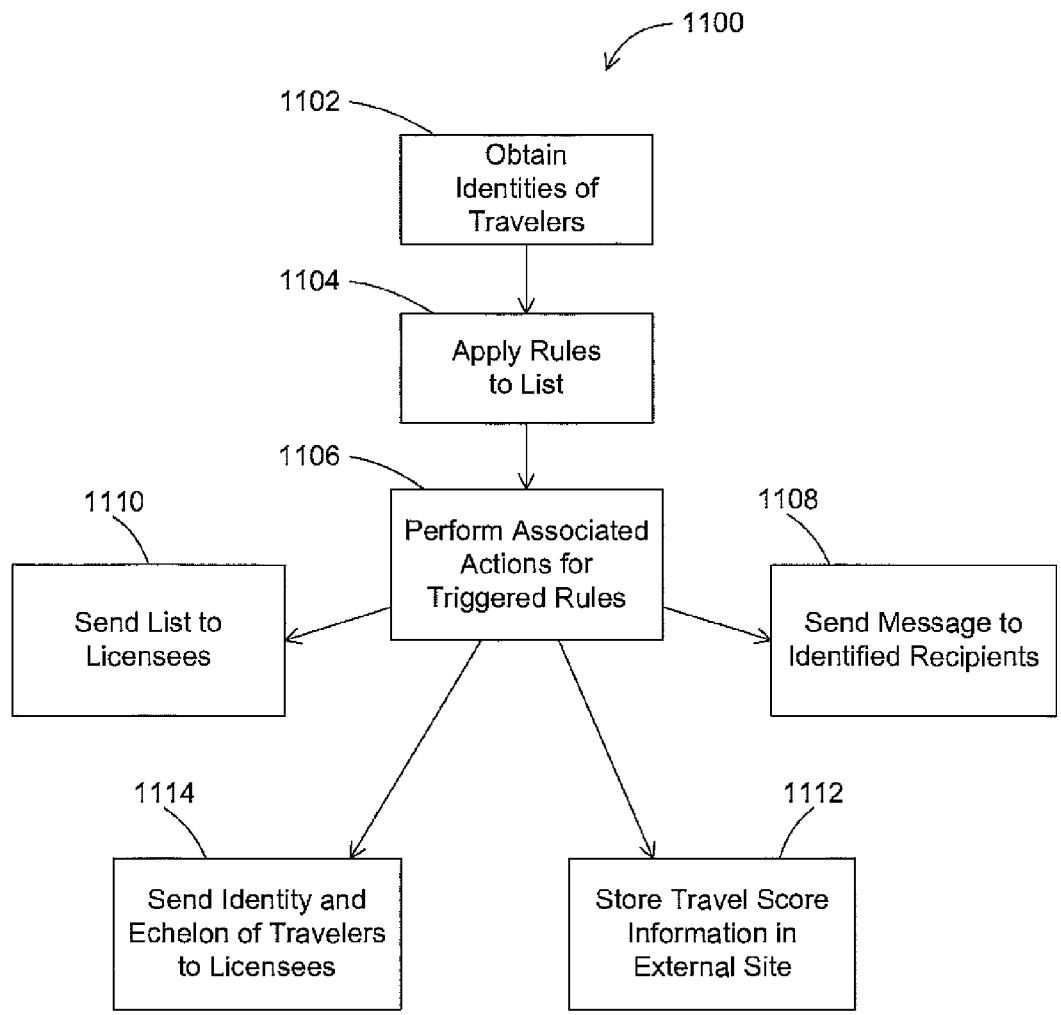
FIG. 11 depicts a notification method of that may be used in a system according to the disclosure.

FIG. 11 illustrates a method 1100 that may be used in a system according to the disclosure in a notification engine such as the notification engine 222 of FIG. 2. In some embodiments, the notification engine 222 is activated when any change has occurred in the travel score information of the travelers in the member database 212. In other embodiments, the notification engine 222 is activated only when one or more travelers' echelons have changed.

In step 1102, the notification engine 222 obtains identities of travelers for whom travel scoring information has changed. The identities may be included in the activation message sent to the notification engine 222 by the scoring engine 220, or the notification engine 222 may obtain the identities from the member database 212. Using the identities, the notification engine also obtains some or all of the travel score information for the identified travelers.

In step 1104, the notification engine 222 applies one or more rules to the travel score information of the identified travelers. Such rules typically include a trigger (or condition) and an associated action. If the condition of a rule is met (or triggered) in step 1104, the notification engine 222 performs the associated action in step 1106.

Steps 1108-1114 present actions, one or more of which may be performed as a result of a rule being triggered in step 1104. In step 1108, an email, SMS, or other message is sent to one or more recipients identified by a traveler notifying the recipient(s) that the traveler's travel score information has changed. In step 1110, a list of travelers and associated travel score information is sent to third parties who have licensed travel score information from an operator of the system 200. The list may include all travelers in the member database 112, only travelers with characteristics specified by the third party, only travelers whose travel score information has changed, only information for specified travel characteristics, or travelers selected by other suitable attributes.

In step 1112, such a list of travelers and associated travel score information are stored in memory accessible by data processing systems external to the system 200 (for example, the list may be stored in an FTP server). Also in step 1112, notification may be sent to one or more third parties that the list is available, along with information needed by the third party to access the list. In step 1114, only information relating to the identities and echelons of travelers in the member database 212 may be sent to third parties.

In various embodiments, various steps described herein can be omitted, repeated, performed sequentially or concurrently, performed in a different order, or otherwise, as described by the claims below. For example, various steps of the processes described herein can be performed iteratively, while the deformed points in each plurality can be obtained concurrently.

While some embodiments according to the disclosure have been described with distinct features, it will be understood that in other embodiments such distinct features may be combined.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1200 may conform to any of the various current implementations and practices known in the art.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method performed by one or more data processing systems, the method comprising:
   for each traveler in a plurality of travelers, calculating a point value for each of a plurality of different travel characteristics of a travel record associated with the traveler;
   comparing the point values for the plurality of travelers;
   ordering the plurality of travelers according to the comparison; and
   for each traveler in the plurality of travelers, storing a total score value representative of the position of the traveler in the ordered plurality of travelers.

2. The method of claim 1, wherein ordering the plurality of travelers according to the comparison comprises:
   calculating one or more statistical measures based on the comparison of the point values for the plurality of travelers; and
   ordering the plurality of travelers according to the one or more statistical measures.

3. The method of claim 1, wherein:
   comparing the point values for the plurality of travelers comprises, for one or more characteristics of the plurality of characteristics:
      comparing the point values for the characteristics associated with the plurality of travelers;
      ordering the plurality of travelers associated with the characteristics according to the comparison; and
      for each traveler in the plurality of travelers, storing a characteristic score value representative of the position of the traveler in the ordered plurality of travelers associated with the characteristics; and
   ordering the plurality of travelers according to the comparison comprises ordering the plurality of travelers according to the one or more characteristic score values.

4. The method of claim 3, wherein:
   comparing the point values for the plurality of travelers comprises storing a characteristic score value for a plurality of characteristics; and
   ordering the plurality of travelers according to the comparison comprises combining the plurality of characteristic score values, including weighting one or more of the plurality of characteristic score values by a corresponding one or more selected weights.

5. The method of claim 3, wherein ordering the plurality of travelers for the characteristics according to the comparison comprises:
   calculating one or more statistical measures based on the comparison of the point values for the characteristics associated with the plurality of travelers; and
   ordering the plurality of travelers associated with the characteristics according to the one or more statistical measures.

6. The method of claim 1, wherein calculating a point value for each of a plurality of characteristics of a travel record of the traveler comprises, for one or more characteristics, measuring a plurality of values associated with each characteristic and calculating the point value based on the plurality of measured values.

7. The method of claim 6, wherein calculating the point value based on the plurality of measured values comprises weighting one or more of the plurality of measured values by a corresponding one or more selected weights.

8. A data processing system comprising:
   a processor; and
   an accessible memory,
   the data processing system configured to:
      for each traveler in a plurality of travelers, calculate a point value for each of a plurality of different travel characteristics of a travel record associated with the traveler;
      compare the point values for the plurality of travelers;
      order the plurality of travelers according to the comparison; and
      for each traveler in the plurality of travelers, store a total score value representative of the position of the traveler in the ordered plurality of travelers.

9. The data processing system of claim 8, wherein the data processing system is further configured to order the plurality of travelers according to the comparison by:
   calculating one or more statistical measures based on the comparison of the point values for the plurality of travelers; and
   ordering the plurality of travelers according to the one or more statistical measures.

10. The data processing system of claim 8, wherein the data processing system is further configured to:
   compare the point values for the plurality of travelers by, for one or more characteristics in the plurality of characteristics:
      comparing the point values for the characteristics associated with the plurality of travelers;
      ordering the plurality of travelers associated with the characteristics according to the comparison; and
      for each traveler in the plurality of travelers, storing a characteristic score value representative of the position of the traveler in the ordered plurality of travelers associated with the characteristics; and
   order the plurality of travelers according to the comparison by ordering the plurality of travelers according to the one or more characteristic score values.

11. The data processing system of claim 10, wherein the data processing system is further configured to:
   compare the point values for the plurality of travelers by storing a characteristic score value for a plurality of characteristics; and
   order the plurality of travelers according to the comparison by combining the plurality of characteristic score values, including weighting one or more of the plurality of characteristic score values by a corresponding one or more selected weights.

12. The data processing system of claim 10, wherein the data processing system is further configured to order the plurality of travelers associated with the characteristics according to the comparison by:
   calculating one or more statistical measures based on the comparison of the point values for the characteristics associated with the plurality of travelers; and
   ordering the plurality of travelers associated with the characteristics according to the one or more statistical measures.

13. The data processing system of claim 8, wherein the data processing system is further configured to calculate a point value for each of a plurality of characteristics of a travel record of the traveler by, for one or more characteristics, measuring a plurality of values associated with each characteristic and calculating a point value based on the plurality of measured values.

14. The data processing system of claim 13, wherein the data processing system is further configured to calculate a point value based on the plurality of measured values by weighting one or more of the plurality of measured values by a corresponding one or more selected weights.

15. A non-transitory computer-readable storage medium encoded with computer-executable instructions that, when executed, cause a data processing system to perform:

for each traveler in a plurality of travelers, calculating a point value for each of a plurality of different travel characteristics of a travel record associated with the traveler;

comparing the point values for the plurality of travelers;

ordering the plurality of travelers according to the comparison; and for each traveler in the plurality of travelers, storing a total score value representative of the position of the traveler in the ordered plurality of travelers.

16. The non-transitory computer-readable storage medium of claim 15, further encoded with computer-executable instructions that, when executed, cause a data processing system to order the plurality of travelers according to the comparison by:

calculating one or more statistical measures based on the comparison of the point values for the plurality of travelers; and ordering the plurality of travelers according to the one or more statistical measures.

17. The non-transitory computer-readable storage medium of claim 15, further encoded with computer-executable instructions that, when executed, cause a data processing system to perform:

comparing the point values for the plurality of travelers by, for one or more characteristics in the plurality of characteristics:

comparing the point values for the characteristics associated with the plurality of travelers;

ordering the plurality of travelers associated with the characteristics according to the comparison; and for each traveler in the plurality of travelers, storing a characteristic score value representative of the position of the traveler in the ordered plurality of travelers associated with the characteristics; and ordering the plurality of travelers according to the comparison by ordering the plurality of travelers according to the one or more characteristic score values.

18. The non-transitory computer-readable storage medium of claim 17, further encoded with computer-executable instructions that, when executed, cause a data processing system to perform:

comparing the point values for the plurality of travelers by storing a characteristic score value for a plurality of characteristics; and ordering the plurality of travelers according to the comparison by combining the plurality of characteristic score values, including weighting one or more of the plurality of characteristic score values by a corresponding one or more selected weights.

19. The non-transitory computer-readable storage medium of claim 17, further encoded with computer-executable instructions that, when executed, cause a data processing system to perform:

calculating one or more statistical measures based on the comparison of the point values for the characteristics associated with the plurality of travelers; and ordering the plurality of travelers associated with the characteristics according to the one or more statistical measures.

20. The non-transitory computer-readable storage medium of claim 15, further encoded with computer-executable instructions that, when executed, cause a data processing system to perform the step of calculating a point value for each of a plurality of characteristics of a travel record of the traveler by, for one or more characteristics, measuring a plurality of values associated with each characteristic and calculating a point value based on the plurality of measured values.

21. The non-transitory computer-readable storage medium of claim 20, further encoded with computer-executable instructions that, when executed, cause a data processing system to perform calculating a point value based on the plurality of measured values by weighting one or more of the plurality of measured values by a corresponding one or more selected weights.

22. The method of claim 1, wherein the plurality of different travel characteristics comprises two or more of:

travel coverage;

travel volume;

travel frequency; and travel status.

\* \* \* \* \*